US005639529A

United States Patent [19]

Gozdecki et al.

[11] Patent Number: 5,639,529

[45] Date of Patent: Jun. 17, 1997

[54] PERMANENT PLACED, EASY REMOVABLE LABEL, FOR BOTTLES AND CANS

[75] Inventors: Ronald M. Gozdecki, Amherst; William D. Swiercz, Lake View; John C. Bane, Grand Island, all of N.Y.

[73] Assignee: Moore Business Forms, Inc., Grand Island, N.Y.

[21] Appl. No.: 12,410

[22] Filed: Feb. 2, 1993

[51] Int. Cl.$^{6}$ .................................. G09F 3/02; B32B 7/12

[52] U.S. Cl. .............................. 428/40.1; 40/310; 40/306; 428/195; 428/198

[58] Field of Search ......................... 40/310, 306; 428/40, 428/43, 195, 198

[56] References Cited

U.S. PATENT DOCUMENTS

| | | | |
|---|---|---|---|
| 2,091,346 | 8/1937 | Wright | 40/4 |
| 2,613,168 | 10/1952 | Totten, Jr. | 154/46 |
| 3,211,470 | 10/1965 | Wilson | 283/18 |
| 3,517,450 | 6/1970 | Greco | 40/2 |
| 3,750,317 | 8/1973 | Morgan | 40/310 |
| 3,994,089 | 11/1976 | Schwartz | 40/310 |
| 4,128,954 | 12/1978 | White | 40/310 |
| 4,208,819 | 6/1980 | Jones et al. | 40/310 |
| 4,318,235 | 3/1982 | Augeri | 40/310 X |
| 4,567,681 | 2/1986 | Fumei | 40/310 |
| 4,612,721 | 9/1986 | Fumei | 40/310 |
| 4,661,188 | 4/1987 | Fumei | 156/244.11 |
| 4,744,161 | 5/1988 | Instance | 40/310 X |
| 5,178,419 | 1/1993 | Bolnick et al. | 40/310 X |
| 5,207,458 | 5/1993 | Treichel et al. | 40/310 X |
| 5,207,746 | 5/1993 | Jones | 40/310 X |

*Primary Examiner*—Daniel Zirker

*Attorney, Agent, or Firm*—Nixon & Vanderhye, P.C.

[57] ABSTRACT

An easily removable label for use in connection with a container to be recycled (e.g. bottle or can). The label has first and second faces. Indicia is provided on the first face and a coating of repositionable adhesive is applied to the second face. The label is also provided with leading and trailing edges which cooperate to form an overlapping area with permanent adhesive which secures one face of the label to the other while at the same time precluding contact of the permanent adhesive with the container. The label may be provided with a perforation line adjacent the overlapping area so that the label may be conveniently separated from the container. The face of the label may be coated with permanent pressure sensitive adhesive release material, and a number of labels provided in a pad. The label provides a lasting adhesion between the container and the label but yet will not leave any significant residue of permanent adhesive once the label is removed.

7 Claims, 3 Drawing Sheets

FIG. 5
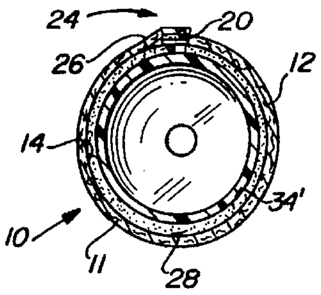
FIG. 3
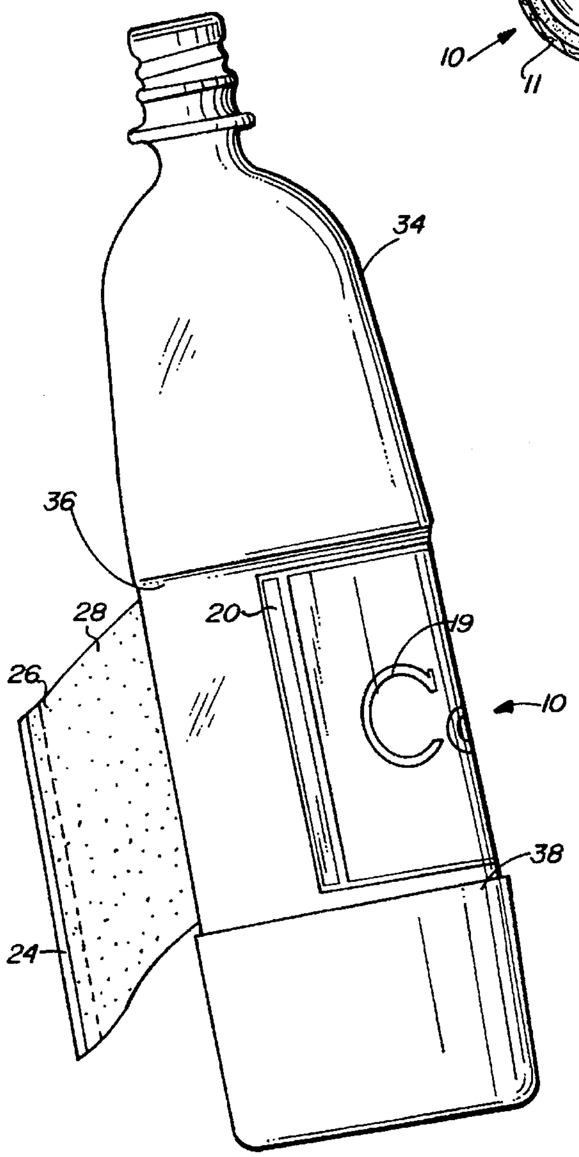
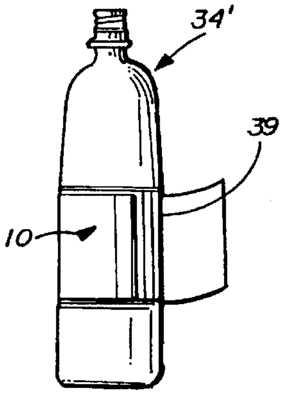
FIG. 4

FIG. 6
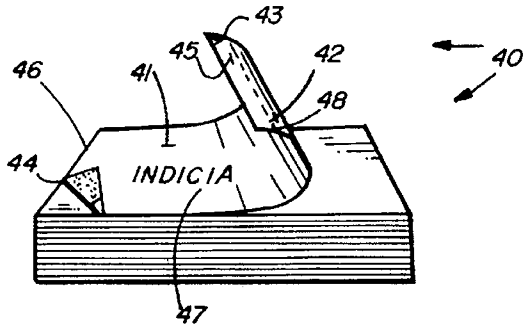
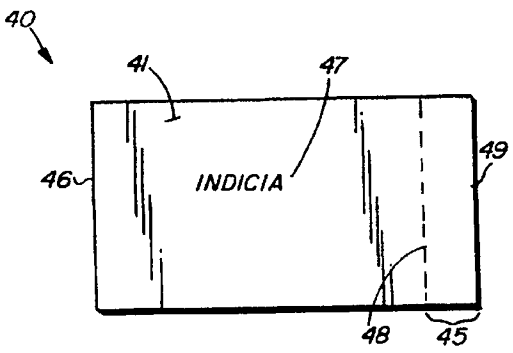
FIG. 7
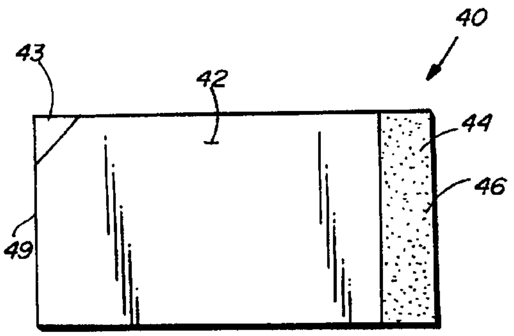
FIG. 8
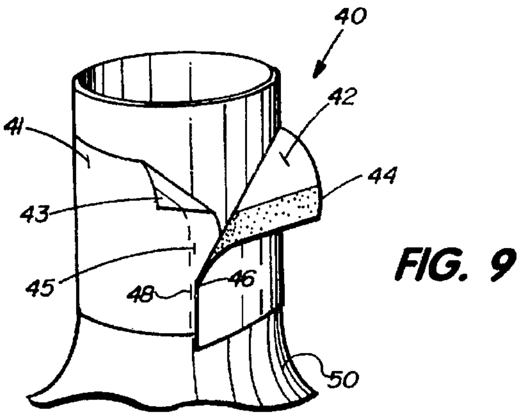
FIG. 9

PERMANENT PLACED, EASY REMOVABLE LABEL, FOR BOTTLES AND CANS

BACKGROUND AND SUMMARY OF THE INVENTION

The present invention relates to an easily removable label that is securely attached to a container yet facilitates recycling by leaving no permanent adhesive residue on the container once the label is separated.

It is known to apply labels to various types of containers. One such method of applying labels is by mechanical means which involve permanently adhering the label to the container by a press or a similar device to prevent slippage or detachment of the label from the product. Another method that is used involves heat shrinking a thermoplastic material around the container to provide a body conforming label. A still further method is to provide a label with temporary bonding characteristics so that the web may then be wrapped about the container while the label is temporarily bonded to the bottle or can.

With increased interest in recycling, the recycler is often faced with the onerous task of having to remove the label prior to recycling the container. When using one of the aforementioned processes remnants of the label or adhesive patterns may remain with the container after the initial stripping step has been completed, or the adhesion of the label to the can, bottle, or other container may be less than desirable. If remnants of adhesive remain, the recycler must then subject the container to a second or even third label/adhesive removal step. Such additional steps are generally time consuming and expensive, thereby decreasing the desirability of containers which have labels that are difficult to remove. However, manufacturers need to provide consumer goods which are aesthetically appealing and ones which will retain their labels during shipping and handling.

In order to remove those labels which have been permanently applied by mechanical means, time consuming and resource intensive efforts, such as water soaking or high pressure water jet, are typically used. This problem is then compounded by the recycler having to then treat the waste water used in the label removal process. Thus, containers having such permanently applied labels may be less appealing to the recycler due to the increased cost associated with the reclamation of the container.

Heat shrink labels on the other hand, while not permanently adhered to a container due to their body conforming fit, typically have to be cut or torn from the container, particularly with respect to glass and metal containers. However, due to the very snug and body conforming fit which accompany the application of heat shrink labels, the label may not be completely severed or removed from the label during the initial attempt. Therefore, the recycler must again attempt to sever the label from the container. Furthermore, heat shrink labels—if not completely separated from the container during the severing process—may tear or peel off in strips creating the additional task of having to collect the strips for subsequent recycling or disposal.

Providing a temporary bond to a label web, while eliminating many of the problems associated with removing labels attached by a permanent adhesive, is more likely to have a tendency towards slippage and subsequent loss from the container as there is no lasting cohesion between the label and the body of the container. If a label happens to become torn the aesthetic appearance of the product is lost and supplemental repackaging may be necessary. Furthermore, should the label slip off the container during subsequent shipping and handling, there would be no readily available means by which the consumer could identify the contents of the package. In addition, packaging that has a disfigured or lost label is often sold by the retailer at a much reduced price in order to move the goods quickly from the inventory.

Other container identification means have also been utilized, such as printing directly on the surface of the can or bottle. This however, may require an additional deinking step before the recycler can reclaim the container or in the alternative, the container may not be suitable for recycling as the various dyes may have contaminated the container material.

Thus, while much work has been done in this area in the past, further improvements are possible. For example, there is a need for a readily removable label that retains a sufficient adhesion to the container and which is also aesthetically appealing while at the same time leaves no significant adhesive residue or label remnants. Such a label would generally improve the efficiency of the recycling process as well as potentially reduce the overall costs associated with the reclamation procedure.

According to the present invention a container and label combination is provided which comprises a container having an exterior surface having a circumference. A label substrate having first and second faces in a generally quadrate configuration, and first and second opposite edges is also provided, the first and second opposite edges spaced from each other a distance greater than the container circumference. The substrate is wrapped around the container exterior surface with the first and second edges overlapping each other. Indicia is printed on the first face of the substrate indicating the contents of the container. A coating of removable (e.g. repositional) adhesive is disposed on the substrate second face and in contact with the container exterior surface to removably hold the substrate in secure contact with the container exterior surface over the majority of the length of the substrate. Removable or permanent adhesive means connect the first and second faces of the label substrate together at the overlapping first second edges, is adhesive unconnected to the container.

Also there preferably are means defining a line of weakness in the label substrate allowing ready severing of the label substrate at the line of weakness to allow ready removal of the label substrate from the container. A line of weakness is disposed adjacent and generally parallel to one of the first and second edges of the substrate, but remote from the permanent adhesive. If permanent adhesive is utilized, the permanent adhesive may be a pressure sensitive adhesive (hot melt), heat activated adhesive, or rewettable adhesive. The container exterior surface may be smooth (that is devoid of surface manifestations for locating the label), and may be a substantially circular cross-section tube.

According to another aspect of the present invention, a label for use with a container is provided. The label comprises a substrate having first and second faces and first and second opposite edges. Indicia is printed on the first face, and a coating of repositional adhesive is disposed on the second face of the substrate. A pattern (e.g. band) of permanent adhesive is disposed adjacent the first edge on one face of the substrate, and an adhesive receiving area may be disposed adjacent the second edge (e.g. an adhesive free band) so as to form a cooperating mating surface for the pattern of permanent adhesive. A line of weakness is formed in the substrate (e.g. a perforation line) so as to allow the label to be readily separated along the line of weakness. The pattern of permanent adhesive may comprise a band of adhesive on the first face of the substrate, and the permanent adhesive receiving area may be disposed on the second face, and be free of adhesive. The removable (e.g. repositional) adhesive may be covered with a release liner, as may the band of permanent adhesive (if it is pressure sensitive).

In the above embodiment, the pressure sensitive permanent adhesive may be disposed on the second face of the substrate between the first edge and the removable adhesive, and the first face of the substrate may be substantially coated with a permanent adhesive release coat (except at the cooperating mating surface). The cooperating mating surface is adjacent the second edge of the substrate. Also a corner portion of the second face of the substrate adjacent the second edge may be provided which contains no removable or permanent adhesive so that a plurality of labels may be disposed in a pad (with the first and second edges of all the labels aligned) and readily removed therefrom. The distance between the first and second edges minus the width of the cooperating mating surface is equal to the circumference of a bottle neck, or a bottle or can body.

It is the primary object of the present invention to provide for an environmentally acceptable yet highly efficient manner of securing a label to a container, such as a bottle or can. This and other objects of the invention will become clear from an inspection of the detailed description of the invention and from the appended claims.

BRIEF DESCRIPTION OF THE DRAWINGS

FIG. 3 is a perspective view illustrating the label of FIGS. 1 and 2 in connection with a first container;

FIG. 4 is a side view of the label of FIGS. 1 and 2 in association with a second container;

FIG. 5 is a cross-sectional view of the container and label combination of FIG. 4 after the label has been applied;

FIG. 6 is a top perspective view of a plurality of a second embodiment of labels according to the invention disposed in a pad configuration;

FIGS. 7 and 8 are top and bottom plan views, respectively, of a label in the pad of FIG. 6; and FIG. 9 is a top perspective view showing the label of FIGS. 7 and 8 being wrapped around a bottle neck.

DETAILED DESCRIPTION OF THE DRAWINGS

Figure 1:
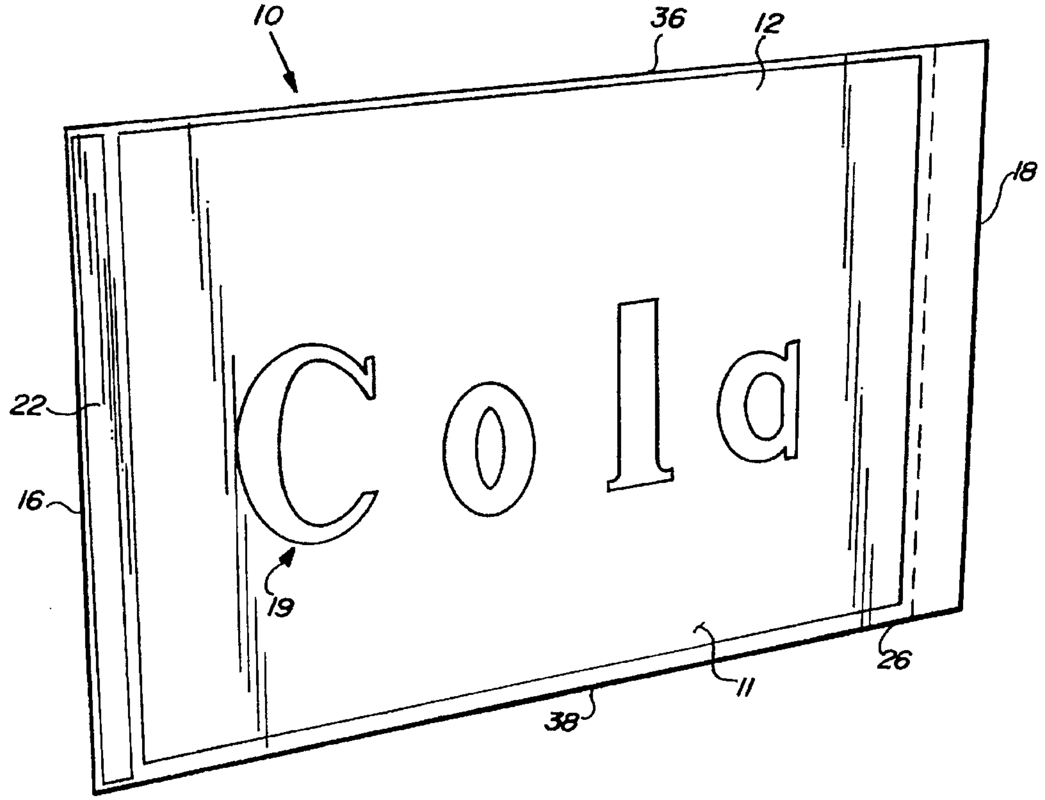
FIG. 1 is a front perspective view illustrating a label constructed in accordance with an exemplary embodiment according to the present invention.

FIG. 1 illustrates an easily removable label 10 used for identification of the contents of a container. The label 10 has a substrate 11 with a first face 12 and a second face 14 (see FIG. 2) as well as first and second edges 16 and 18, respectively. The label substrate 11 may be constructed from any suitable material, e.g. paper, plastic film, foil or the like, which is acceptable for printing, which will accept an adhesive coating, and which will—in sheet form—readily conform to a container wall. As shown in the drawings, substrate 11 is preferably quadrate in configuration, although it can have other shapes (e.g. parallelogram). Indicia 19 is printed on first face 12.

Figure 2:
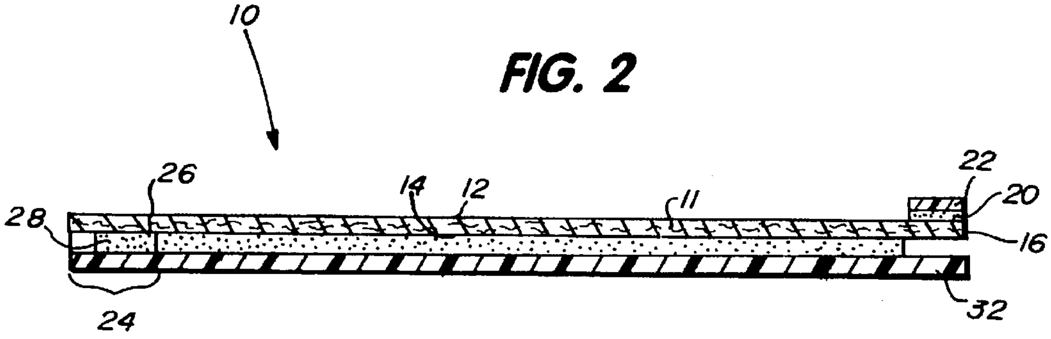
FIG. 2 is a cross sectional view illustrating the FIG. 1 label showing the distinct layers thereof.

Referring now to FIG. 2 which illustrates a cut away view showing the distinct layers of the label 10, the second face 14 of substrate 11 is provided with a coating of removable (e.g. repositionable) adhesive 28. The purpose of the removable adhesive 28 is to provide a lasting adhesion between the label substrate 11 and a container to which it is applied, yet allow the label to be readily removable to facilitate recycling of the container. It will be appreciated that due to the removable nature of the adhesive 28, no adhesive residue is left on the container once the label 10 has been stripped off. In addition, the coating of removable adhesive 28 provides additional security to the label 10 and prevents the label 10 from slipping off the container during shipment and subsequent handling as well as decreasing the possibility that the label be inadvertently torn. This added security provided by the removable adhesive coating 28 on the second face 14 insures that the aesthetic and identification features associated with the label 10 will be retained with the container thereby eliminating the potential need for repackaging or sale of the contents at a loss. Exemplary repositional adhesive that may be used is that used by Moore Business Forms, Inc. of Lake Forest, Ill., on its NOTE STIX® business forms, or sold under the trademark CLEANTAC™, or other removable adhesives that are not repositional may be used.

The first edge 16 has a band, or other pattern, of permanent or removable adhesive 20 adjacent thereto, preferably disposed on the first face 12 of substrate 11. The adhesive 20 may be of the pressure sensitive type, or may be a heat activatable adhesive, or a rewettable type adhesive, or the like. Should a pressure sensitive adhesive 20 be selected, a removable release liner 22 is utilized to cover the adhesive. On the opposite or second edge 18, and on the opposite face of substrate 11 to that of the adhesive band 20 (e.g. on face 14), a mating area 24 is provided for mating engagement with the band of adhesive 20 when the label 10 is wrapped around a container. The area 24 may be completely adhesive free or may be covered fully or in part by an adhesive complimentary to permanent adhesive 20, which may include the repositional adhesive 28.

A line of weakness (e.g. perforation line, blade slit, or the like) 26 is provided in the substrate 11. For example, a perforation line 26 may be adjacent second edge 18 and parallel thereto, but spaced a sufficient distance from edge 18 to allow the full width of the permanent adhesive band 20 to engage the substrate 11 near edge 18. The perforation line 26 enables the label 10 to be stripped from the container by either the consumer or by the recycler in a quick and easy fashion, thereby facilitating reclamation of the container without having to subject the container to conventional methods such as soaking or water jets.

A conventional release liner 32 (see FIG. 2) may be provided covering the repositional adhesive 28 to protect it until use.

FIG. 3 illustrates the label 10 being wrapped around a container 34, e.g. a plastic bottle. In a preferred embodiment, the first edge 16, with the adhesive band 20 adjacent thereto, is positioned on the container 34. The repositionable adhesive 28 provided on the second face 14 serves to secure the substrate 11 to the container 34 as the substrate 11 is wrapped about the container 34. Nearing completion of the wrapping, the second edge 18, having a mating band 24, is positioned so that the band 24 will will come into direct, overlying contact with the permanent adhesive band 20. It will be appreciated, that should a pressure sensitive adhesive be selected for use with the adhesive band 20, a release liner 22 (see FIG. 2) will cover the adhesive 20 and the removal of liner 22 will be necessary prior to adhering the adhesive band 20 to the mating (e.g. adhesive free) area 24. Accordingly, should other adhesives be selected, subsequent treatment steps may be necessary, such as application of heat or moisture prior to final sealing of the label substrate 10.

The aforementioned arrangement provides that the adhesive band 20 when in contact with the mating area 24 will prevent contact of the permanent adhesive with the container and thereby eliminate the need for the additional steps of soaking baths and water jets as no permanent adhesive residue will be left on the container. The adhesive 28 will adhere the substrate 11 to the container 34 until positively removed by a removal force.

To remove the label substrate 10 from the the container 34, the consumer or recycler grasps the label substrate 11 at either the top or bottom marginal edge, 36 and 38, respectively, at or near the line of weakness 26 and pulls in the appropriate direction (e.g. if the consumer or recycler grasps the label 10 at the bottom margin 38, he or she would pull generally upwardly). The label substrate 11 detaches at the line 26 so that the label 10 may be easily and readily removed from the container 34. The overlying arrangement provided by the mating strip 24 and the adhesive band 20 insures that the label substrate bond is thereby completely separated from the container 34 without leaving any residue from the permanent adhesive, since the repositional adhesive leaves no residue.

In FIG. 3, the container 34—a soda bottle—is shown having locating surface manifestations 36, 38 for the label 10. However because of the repositional adhesive 28 being provided on the second face 14 of the substrate 11, the locating surfaces 36, 38 as are often provided on cans or bottles, are not necessary. As shown in FIG. 4, with respect to the bottle 34' having substantially "straight" side walls 39, a label 10 can be applied without locating mechanisms such as 36, 38 since the repositional adhesive 28 will prevent slippage.

FIG. 5 shows an exemplary container/label combination according to the invention in which the label 10 has been wrapped around the substantially circular tubular outer surface of the container 34', the repositional adhesive 28 engaging the outer surface of the container 34', while the permanent adhesive 20 adheres the faces 12, 14 of the substrate 11 together at the overlapped portion (e.g. 24) adjacent the edges 16, 18 of the substrate 11.

While the label 10 may be constructed as illustrated in FIGS. 1 and 2, and the release liner removed to properly position it in place on a container, according to a modification of the invention the label could comprise part of a "label stock" that was continuous (each individual label 10 being separated by a transverse perforation or the like), and taken up on a roll. The label stock may then be let out from the roll, the adhesive band 20 applied to the appropriate face thereof, each individual label 10 severed from the adjacent label along the line of weakness (or by a cutting mechanism), and then the label wrapped around the container 34, 34'. The adhesive may be curable by radiation (e.g. UV), solvent curable, or of other types. In this way there are no release liners 32 to dispose of. Of course in this embodiment, it is necessary that the face 12 of the substrate 11 have a surface configuration such that it will readily separate from the repositional adhesive 28.

Another embodiment of label according to the present invention is shown in a pad configuration generally by reference numeral 40 in FIG. 6. Each of the labels 40 of the pad has a first face 41 and a second face 42. The second face 42 has a corner portion 43 thereof (see FIGS. 6 and 8 in particular) that is free of adhesive, and a pattern (strip) of permanent pressure sensitive adhesive 44 adjacent a first edge 46 thereof for cooperating with a mating surface portion 45 on the first face 41. The rest of the second face 42 aside from the corner 43 and the permanent adhesive strip 44 is preferably coated with removable adhesive, such as repositional adhesive. Indicia 47 is preferably printed on the first face 41, and also the first face 41 is coated over substantially the entire surface thereof, except the portion 45, with a conventional permanent adhesive release coat. The portion 45 is preferably between a line of weakness (e.g. perforation) 48 separating it from the release coated rest of the face 41, and a second edge 49 of the label opposite the first edge 46 and parallel thereto. The portion 45 may be coated with a removable adhesive release coating only (that is not a permanent adhesive release coating), or it may uncoated depending upon the material making up the label 40 substrate, and the particular removable (e.g. repositional) adhesive utilized.

Preferably the distance between the first and second edges 46, 49, minus the width of the section 45, is substantially equal to the curved circumference of a bottle neck 50 (see FIG. 9), allowing the label 40 to be wrapped around the bottle neck with the permanent adhesive strip 44 engaging the cooperating mating surface 45 which is receptive to it. Alternatively the label 40 can be made so that that distance is equal to the circumference of a can or bottle body, and the can or bottle need not have any particular surface manifestations either on the neck or main body thereof to accommodate the label 40.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A label for use with a container, comprising:

a substrate having first and second faces and first and second edges;

indicia printed on said first face;

a coating of removable adhesive disposed on said second face of said substrate for adhering to a container until positively removed by a removal force, and substantially completely covering said second face; and a pattern of permanent adhesive disposed adjacent said first edge on one face of said substrate, and an adhesive receiving area disposed adjacent said second edge so as to form a cooperating mating surface for said pattern of permanent adhesive.

2. A label for use with a container, comprising:

a substrate having first and second faces and first and second edges;

indicia printed on said first face;

a coating of removable adhesive disposed on said second face of said substrate for adhering to a container until positively removed by a removal force; and a pattern of permanent adhesive disposed adjacent said first edge on one face of said substrate, and an adhesive receiving area disposed adjacent said second edge so as to form a cooperating mating surface for said pattern of permanent adhesive, said pattern of permanent adhesive comprising a band of pressure sensitive adhesive provided with a release liner.

3. A label for use with a container, comprising:

a substrate having first and second faces and first and second edges;

indicia printed on said first face;

a coating of removable adhesive disposed on said second face of said substrate for adhering to a container until positively removed by a removal force, said removable adhesive being covered with a release liner; and a pattern of permanent adhesive disposed adjacent said first edge on one face of said substrate, and an adhesive receiving area disposed adjacent said second edge so as to form a cooperating mating surface for said pattern of permanent adhesive.

4. A label for use with a container, comprising:

a substrate having first and second faces and first and second edges;

indicia printed on said first face;

a coating of repositional adhesive disposed on said second face of said substrate for adhering to a container until positively removed by a removal force; and a pattern of permanent adhesive disposed adjacent said first edge on one face of said substrate, and an adhesive receiving area disposed adjacent said second edge so as to form a cooperating mating surface for said pattern of permanent adhesive.

5. A label for use with a container, comprising:

a quadrate substrate having first and second faces and first and second edges;

indicia printed on said first face;

a coating of removable adhesive disposed on said second face of said substrate for adhering to a container until positively removed by a removal force, said coating of removable adhesive covered by a release liner; and a pattern of permanent adhesive disposed adjacent said first edge on one face of said substrate, and an adhesive receiving area disposed adjacent said second edge so as to form a cooperating mating surface for said pattern of permanent adhesive.

6. A label for use with a container, comprising:

a quadrate substrate having first and second faces and first and second edges;

indicia printed on said first face;

a coating of removable adhesive disposed on said second face of said substrate for adhering to a container until positively removed by a removal force;

a pattern of permanent adhesive disposed adjacent said first edge on one face of said substrate, and an adhesive receiving area disposed adjacent said second edge so as to form a cooperating mating surface for said pattern of permanent adhesive; and wherein said pattern of permanent adhesive is a pattern of pressure sensitive adhesive disposed on said second face of said substrate between said first edge and said removable adhesive, and wherein said first face of said substrate is substantially coated with a permanent adhesive release coat except at said cooperating mating surface, said cooperating mating surface adjacent a second edge of said substrate, opposite said first edge; and a corner portion of said second face of said substrate adjacent said second edge thereof which contains no removable or permanent adhesive; and in combination with a plurality of other such labels disposed in a pad, with the first edges and second edges of all labels aligned.

7. A label for use with a container, comprising:

a quadrate substrate having first and second faces and first and second edges;

indicia printed on said first face;

a coating of removable adhesive disposed on said second face of said substrate for adhering to a container until positively removed by a removal force;

a pattern of permanent adhesive disposed adjacent said first edge on one face of said substrate, and an adhesive receiving area disposed adjacent said second edge so as to form a cooperating mating surface for said pattern of permanent adhesive; and wherein said pattern of permanent adhesive is a pattern of pressure sensitive adhesive disposed on said second face of said substrate between said first edge and said removable adhesive, and wherein said first face of said substrate is substantially coated with a permanent adhesive release coat except at said cooperating mating surface, said cooperating mating surface adjacent a second edge of said substrate, opposite said first edge; and wherein said removable adhesive is repositional adhesive; and wherein said repositional adhesive substantially completely covers said second face.

* * * * *